United States Patent
Basha et al.

(10) Patent No.: US 9,684,058 B2
(45) Date of Patent: Jun. 20, 2017

(54) METHOD OF ESTIMATING THE POSITION OF A USER DEVICE USING RADIO BEACONS AND RADIO BEACONS ADAPTED TO FACILITATE THE METHODS OF THE INVENTION

(71) Applicant: SENSEWHERE LIMITED, Edinburgh (GB)

(72) Inventors: Syed Usman Basha, Edinburgh (GB); Firas Alsehly, Edinburgh (GB); Tughrul Sati Arslan, Edinburgh (GB)

(73) Assignee: SENSEWHERE LIMITED, Edinburgh (GB)

( * ) Notice: Subject to any disclaimer, the term of this patent is extended or adjusted under 35 U.S.C. 154(b) by 428 days.

(21) Appl. No.: 14/351,611

(22) PCT Filed: Oct. 15, 2012

(86) PCT No.: PCT/GB2012/052555
§ 371 (c)(1),
(2) Date: Apr. 14, 2014

(87) PCT Pub. No.: WO2013/054144
PCT Pub. Date: Apr. 18, 2013

(65) Prior Publication Data
US 2015/0119071 A1 Apr. 30, 2015

Related U.S. Application Data

(60) Provisional application No. 61/649,977, filed on May 22, 2012.

(30) Foreign Application Priority Data

Oct. 13, 2011 (GB) .................................. 1117723.5

(51) Int. Cl.
*G01S 3/02* (2006.01)
*G01S 5/02* (2010.01)
(Continued)

(52) U.S. Cl.
CPC .............. *G01S 5/0231* (2013.01); *G01S 1/68* (2013.01); *G01S 5/0236* (2013.01); *G01S 5/14* (2013.01);
(Continued)

(58) Field of Classification Search
CPC . G01S 3/02; G01S 1/68; G01S 5/0231; G01S 5/0236; G01S 5/14; G01S 11/06;
(Continued)

(56) References Cited

U.S. PATENT DOCUMENTS 8,200,251 B2  6/2012  Huang
8,700,060 B2  4/2014  Huang
(Continued)

FOREIGN PATENT DOCUMENTS

EP    2 259 084    12/2010
EP    2 261 688    12/2010
(Continued)

OTHER PUBLICATIONS

Blumenthal et al., "Minimal Transmission Power vs. Signal Strength as Distance Estimation for Localization in Wireless Sensor Networks", *2006 3rd Annual IEEE Communications Society Conference on Sensor and AD HOC Communications and Networks*, Jan. 1, 2006, pp. 761-766.
(Continued)

*Primary Examiner* — Harry Liu
(74) *Attorney, Agent, or Firm* — Nixon & Vanderhye P.C.

(57) ABSTRACT

Disclosed is the estimation of the position of a user device (18) using radio beacons (B1-B4) which are operable at a plurality of transmit power levels. The radio beacons (B1-
(Continued)

B4) may transmit their position and current transmit power level. Estimates of distance between a user device and a radio beacon can take into account both received signal strength and the current transmit power level of the radio beacon. The position of the user device (18) can be estimated taking into account whether a radio beacon (B1-B4)) can be detected at a given transmit power level. The transmit power level of the radio beacon may vary according to a cycle. The transmit power level of the radio beacon may be changed to facilitate positioning, for example in response to a signal from a user device. A radio beacon (B1-B4) changes transmit power level in a cycle. The radio beacon can reduce transmit power level responsive to a signal. The radio beacon (B1-B4) may be compatible with Bluetooth short range wireless connectivity standard core specification version 4.0.

27 Claims, 12 Drawing Sheets

(51) Int. Cl.
| | | |
|---|---|---|
| *H04W 84/00* | (2009.01) | |
| *G01S 1/68* | (2006.01) | |
| *G01S 5/14* | (2006.01) | |
| *G01S 11/06* | (2006.01) | |
| *H04W 48/16* | (2009.01) | |
| *H04W 84/12* | (2009.01) | |
| *H04W 84/18* | (2009.01) | |

(52) U.S. Cl.
CPC .............. *G01S 11/06* (2013.01); *H04W 84/00* (2013.01); *H04W 48/16* (2013.01); *H04W 84/12* (2013.01); *H04W 84/18* (2013.01); *Y02B 60/50* (2013.01)

(58) Field of Classification Search
CPC ....... H04W 48/16; H04W 4/00; H04W 84/12; H04W 84/18; Y02B 60/50
USPC ........................................................ 342/464
See application file for complete search history.

(56) References Cited

U.S. PATENT DOCUMENTS

| | | | | |
|---|---|---|---|---|
| 2002/0045424 A1* | 4/2002 | Lee | ........................ | H04W 36/30 455/41.2 |
| 2002/0180640 A1* | 12/2002 | Gilkes | .................. | H04W 64/00 342/387 |
| 2005/0136845 A1* | 6/2005 | Masuoka | .............. | G01S 5/0294 455/67.14 |
| 2005/0277426 A1 | 12/2005 | Evans et al. | | |
| 2008/0238661 A1 | 10/2008 | Camp et al. | | |
| 2009/0325598 A1* | 12/2009 | Guigne | ................... | G01S 5/021 455/456.1 |
| 2010/0303129 A1* | 12/2010 | Huang | .................... | G01S 1/042 375/132 |
| 2010/0324813 A1 | 12/2010 | Sundararajan et al. | | |
| 2011/0205125 A1 | 8/2011 | Lin et al. | | |
| 2011/0211563 A1* | 9/2011 | Herrala | ..................... | G01S 1/68 370/338 |
| 2011/0221635 A1 | 9/2011 | Wang | | |
| 2011/0223931 A1* | 9/2011 | Buer | ........................ | G01S 5/12 455/456.1 |
| 2011/0233280 A1* | 9/2011 | Bianconi | ............ | G06K 7/10881 235/462.46 |
| 2011/0260923 A1 | 10/2011 | Liao et al. | | |
| 2012/0133555 A1 | 5/2012 | Hyun | | |
| 2012/0157123 A1 | 6/2012 | Li et al. | | |
| 2012/0184296 A1 | 7/2012 | Milosiu et al. | | |
| 2012/0235812 A1* | 9/2012 | Maia | ....................... | G01S 13/08 340/539.13 |
| 2012/0264454 A1* | 10/2012 | Agardh | ................. | G01S 5/0236 455/456.2 |
| 2013/0028245 A1* | 1/2013 | Oerton | .................... | H04W 4/00 370/338 |

FOREIGN PATENT DOCUMENTS

| | | |
|---|---|---|
| JP | 10-336727 | 12/1998 |
| KR | 10-2010-0047989 | 5/2010 |
| KR | 10-2010-0124649 | 11/2010 |
| KR | 10-2011-0032293 | 3/2011 |
| WO | 99/31921 | 6/1999 |
| WO | WO 2004/014096 | 2/2004 |
| WO | WO 2008/117105 | 10/2008 |
| WO | 2010/075369 | 7/2010 |
| WO | 2010/078844 | 7/2010 |
| WO | 2011/041786 | 4/2011 |
| WO | 2011/047310 | 4/2011 |
| WO | 2011/127659 | 10/2011 |
| WO | 2012/082828 | 6/2012 |

OTHER PUBLICATIONS

Vivekanandan et al., "Concentric Anchor-Beacons (CAB) Localization for Wireless Sensor Networks", *Communications, 2006. ICC '06. IEEE International Conference on, IEEE, PI*, Jun. 1, 2006, pp. 3972-3977.

International Search Report for PCT/GB2012/052555, mailed Jan. 16, 2013.

* cited by examiner

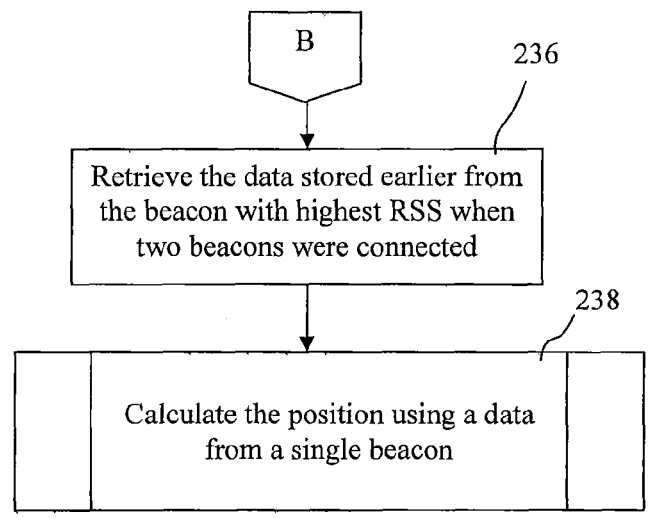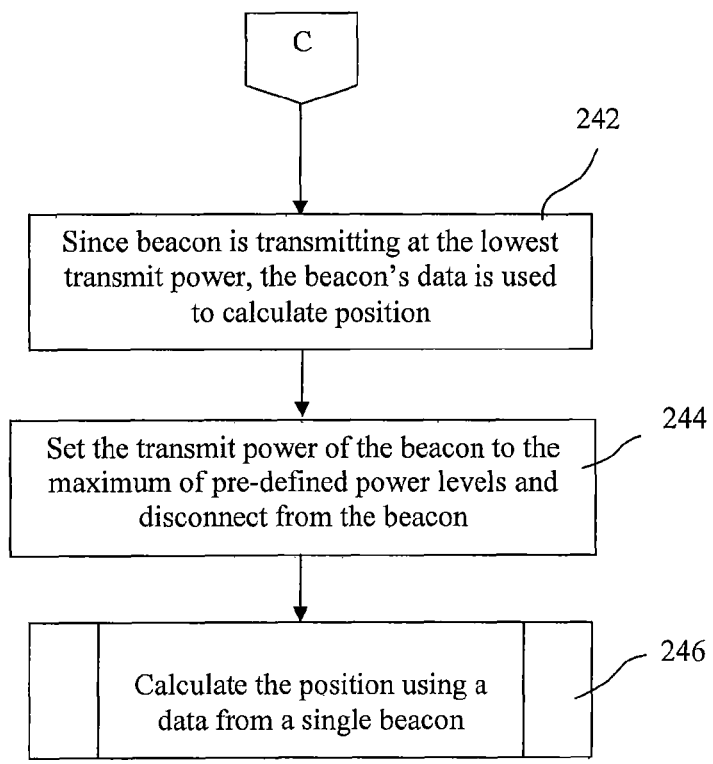
Fig. 9D

METHOD OF ESTIMATING THE POSITION OF A USER DEVICE USING RADIO BEACONS AND RADIO BEACONS ADAPTED TO FACILITATE THE METHODS OF THE INVENTION

This application is the U.S. national phase of International Application No. PCT/GB2012/052555 filed 15 Oct. 2012 which designated the U.S. and claims priority to GB Patent Application No. 1117723.5 filed 13 Oct. 2011 and claims the benefit of U.S. Provisional Application No. 61/649,977 filed 22 May 2012, the entire contents of each of which are hereby incorporated by reference.

FIELD OF THE INVENTION

The invention concerns a method of estimating the position of a user device using radio beacons which have a plurality of discrete transmit power levels, and radio beacons adapted to facilitate estimates of the position of a user device.

BACKGROUND TO THE INVENTION

In recent years there has been considerable interest in determining the position of user devices, such as cellular telephones, portable electronic computers and other portable personal user devices. Systems based on the use of global satellite navigation systems (e.g. GPS) are useful out of doors but are of limited use within buildings and have only limited positioning accuracy. Accordingly, it is desirable to determine the position of user devices using alternative technologies, particularly those which are useful indoors, either as an alternative to or in combination with global satellite navigation systems to obtain more accurate measurements of position.

It is known to determine position by detecting radio beacons which transmit radio signals over relatively low distances, for example, connectable radio beacons which allows access to a LAN and non-connectable radio beacons which simply transmit data, such as their identifier. Using a database of the position of such radio beacons it is possible to determine position using techniques such as measuring received signal strength and triangulation.

The invention aims to provide improvements to these technologies, to enable more accurate measurements of position to be made, or to enable measurements to be made more simply, for example, some embodiments enable an estimate of position without a requirement to measure received signal strength. The invention also provides radio beacons which facilitate the methods of the invention.

SUMMARY OF THE INVENTION

According to a first aspect of the invention there is provided a method of estimating the position of a user device comprising a radio receiver, the method comprising detecting one or more radio beacons operable at any of a plurality of discrete transmit power levels, and calculating an estimate of the position of the user device taking into account transmit power data concerning the transmit power level of the one or more said radio beacons at the time when the respective radio beacon is detected and beacon position data concerning the position of the one or more said radio beacons.

Thus, an estimate of the position of the user device can be obtained using the acquired knowledge of the position of some or all of the detected radio beacons and data concerning the range at which the user device would typically be detectable. For example, if a single radio beacon can be detected which is operating at a transmit power level at which it would typically be detectable at a range of 5 m, then the position of the user device can be estimated as being within 5 m of the position of the radio beacon. If two radio beacons can be detected, one of which is operating at a transmit power level at which it would typically be detectable at a range of 5 m, the other of which is operating at a transmit power level at which it would typically be detectable at a range of 10 m, the position of the user device can be estimated as within the locus of points 5 m from the first radio beacon and 10 m from the second radio beacon.

The one or more radio beacons may be Bluetooth beacons. The radio receiver may be a Bluetooth receiver.

The beacon position data may be received from a database of the position of radio beacons. However, the beacon position data may be received from the radio beacons, for example, some or all of the radio beacons may transmit their position as part of the radio signals which they transmit.

Some or all of the transmit power data may be received from a database of transmit power levels associated with specific radio beacons. Such data may comprise data indicative of the transmit power level which specific radio beacons will adopt at specific times.

Preferably, some or all of the transmit power data is received from the radio beacons. For example, the radio beacons may transmit data related to transmit power level to the user device as part of the radio signals (e.g. Bluetooth signals) which they transmit.

The transmit power data could be data specifying the transmit power level (e.g. transmit power level in dBmW (power ratio of the transmit power level to 1 mW express in decibels), or other appropriate units, or a label representative of a respective transmit power level). The data related to transmit power level could be expressed in a different way, for example, it could in principle be data specifying the range over which the radio beacon could be expected to be detectable (for example, a distance in meters or other units, or a label representative of a respective range over which a radio beacon could be expected to be detectable).

The user device is typically a mobile personal user device, such as a cellular telephone, personal digital assistant or laptop computer. The method of the invention requires the user device to have a radio receiver (typically a radio transceiver) suitable for receiving signals from the radio beacons, for example, WiFi or Bluetooth short range wireless connectivity standard core specification version 4.0 compatible low range radio transceivers.

Typically the radio receiver is configured to receive signals complying with a short range (i.e. typically a range of less than 500 m, more typically a range of less than 200 m, even more typically a range of less than 100 m) wireless connectivity standard, such as Wi-Fi or Bluetooth. Typically the one or more radio beacons are configured to transmit signals complying with a short range (i.e. typically a range of less than 500 m, more typically a range of less than 200 m, even more typically a range of less than 100 m) wireless connectivity standard, such as Wi-Fi or Bluetooth. In one embodiment, the one or more radio beacons may be connectable radio beacons, such as Wi-Fi access points, and the radio receiver is configured to receive signals form the connectable radio beacons. More typically, the one or more radio beacons are Bluetooth beacons and the radio receiver is a Bluetooth receiver. That is, the one or more radio beacons are configured to transmit signals complying with one or more of the Bluetooth short range wireless connectivity standards and the radio receiver is configured to receive signals complying with that or those Bluetooth short range wireless connectivity standards. Some or all of the radio beacons may be, for example, radio beacons compatible with the Bluetooth short range wireless connectivity standard core specification version 4.0 or later, and the radio receiver may also be compatible with the Bluetooth short range wireless connectivity standard core specification 4.0 or later. Thus, preferably the radio beacons are configured to transmit signals complying with the Bluetooth wireless connectivity standard version 4.0 or later and the radio receiver is preferably configured to receive signals complying with the Bluetooth wireless connectivity standard version 4.0 or later. The Bluetooth short range wireless connectivity standard core specification version 4.0 is advantageous at is allows transmission at any of a plurality of discrete transmit power levels. Bluetooth is a trade mark of the Bluetooth special interest group. The Bluetooth short range wireless connectivity standard core specification is published from time to time at the domain www.bluetooth.org.

By the range at which the user device would typically be detectable we refer to the distance from the radio beacon at which it would typically be possible for a compatible radio receiving device to receive digital data reliably from (and in the case of a connectable radio beacon, to transmit digital data reliably to) the radio beacon without unusual circumstances or structures between the radio beacon and the user device. In practice there will be some variation between user devices or depending on the precise configuration of the environment around the radio beacon.

The methods of the invention are advantageous in that they are useful indoors where positioning systems such as global satellite navigations systems may not be available. Thus, the method may be a method of estimating the position of a user device indoors (although it typically also functions out doors). The method may be a method of estimating the position of a user device where global satellite navigation signals cannot be received by the user device (although it typically also functions where global satellite navigation signal can be received by the user device).

It may be that, in at least some circumstances, the method does not take into account any measure of the strength of the signals received from the one or more radio beacons beyond whether or not the radio beacons can be detected. It may be that, in at least some circumstances, the method does not take into account any measure of the time of flight of the signals received from the one or more radio beacons. It may be that in at least some circumstances (and in some embodiments, always), the data received from the one or more radio beacons which is taken into account is entirely digital data received from the one or more radio beacons (e.g. an identifier of the radio beacon, data concerning the position of the radio beacon etc.). Thus, the method comprises taking into account whether radio beacons can be detected and, although it can in some embodiments be assisted by such data, does not rely on analogue measurements of signal strength or signal propagation time.

The step of detecting one or more radio beacons and calculating an estimate of the position of the user device taking into account transmit power data concerning the transmit power level of the one or more said radio beacons at the time when the respective radio beacon is detected, is typically repeated, e.g. periodically.

It may be that the method takes into account that one or more radio beacons can not be detected at a given point in time. The method may therefore comprise deducing that the user device is not within a locus at which a specific radio beacon of known position could be detected. This may be used for example in the situation where two radio beacons can be detected to determine in which of two discrete loci on either side of a line joining the two radio beacons, the user device is located.

Preferably, the method may take into account the transmit power level of a radio beacon at a given time at which that beacon cannot be detected. The method may comprise taking into account that a radio beacon can be detected at a time when it is outputting signals at a first transmit power level and cannot be detected at a time when it is outputting signals at a second lower transmit power level. In the circumstance it can be inferred that the user device is within an annulus centered on the radio beacon, having an inner radius equal to the distance at which signals at the second lower transmit power level could typically be detected and an outer radius equal to the distance at which signals at the first transmit power level could typically be detected. Thus, a measurement of received signal strength is not essential. It is either the case that there is sufficient received signal strength for the radio beacon to be detected and for digital data to be received from it, or there is not. Nevertheless, it may be that calculating an estimate of the position of the user device takes into account measurements of the strength of signals received from at least one of the one or more detected radio beacons.

It may be that for some or all of the radio beacons, the respective radio beacon automatically switches between at least some of the plurality of discrete transmit power levels (typically periodically), for example it may change between discrete transmit power levels in a cycle. The method may comprise controlling (e.g. programming or instructing) some or all of the radio beacons to automatically switch between at least some of the plurality of discrete transmit power levels according to a program, for example they may be controlled to change periodically between discrete transmit power levels in a cycle. A cycle may be a cycle in which the transmit power level decreases monotonically from a highest level (which need not be the maximum transmit power level of which the respective radio beacon is capable) through at least one intermediate level to a lowest level before returning to the said highest level.

Therefore the method may comprise determining that a radio beacon could be detected when it was transmitting signals at a first transmit power level but not when it was transmitting signals after changing to a second lower transmit power level. The method may then comprise determining that the user device is located at a distance from the radio beacon less than the distance at which signals at the first transmit power level could typically be detected and greater than the distance at which signals at the second transmit power level could typically be detected.

In a preferred embodiment, the method comprises the step of causing a radio beacon to change its transmit power level (by transmit power level we refer to a power level at which data can be transmitted, i.e. a non-zero power level at which the beacon can transmit data signals) to facilitate the estimation of the position of the user device. The user device, or a positioning controller, may be programmed to generate a signal to cause a radio beacon to change its transmit power level to facilitate the estimation of the position of a user device. Typically, the user device, or a positioning controller, generates a signal to cause a radio beacon to reduce its transmit power level from a first discrete transmit power level to a second lower discrete transmit power level.

Typically the signal causes the radio beacon to reduce the transmit power level at which it transmits directly. That is, the signal preferably causes the radio beacon to reduce the transmit power level at which it transmits without ever changing (e.g. cycling) the transmit power level through any higher power levels before reducing the transmit power level. Preferably, the signal causes the radio beacon to reduce the transmit power level at which it transmits within 1 second of receiving the received signal, more preferably within 0.5 seconds of receiving the received signal, and even more preferably within 0.25 seconds of receiving the received signal. In each case, the reduction from the first discrete transmit power level to a second discrete transmit power level typically takes place unless the first discrete transmit power level is the lowest discrete transmit power level of a plurality of discrete transmit power levels at which the radio beacon is operable. If this (i.e. reducing the transmit power level of the radio beacon) causes the user device to no longer be able to detect the radio beacon then this enables a calculation to be made that the user device is at a distance from the radio beacon less than the distance at which signals at the first transmit power level could typically be detected and greater than the distance at which signals at the second transmit power level could typically be detected. If the radio beacon can still be detected by the user device, and if the radio beacon has a still lower discrete power level, the method may comprise the user device or a positioning controller again causing the radio beacon to reduce its transmit power level.

By enabling the user device or a positioning controller to change, and in particular to reduce, the transmit power level of the radio beacon, calculations taking into account whether or not the radio beacon can be detected at given transmit power levels can be carried out more quickly. The transmit power level of the radio beacon may, however, be changed for other purposes, for example it may be increased to obtain a stronger signal meaning that measurement of distance to the radio beacon (for example based on received signal strength) will be more accurate (due to improved signal to noise ratio). Any such increase may be temporary to enable the radio beacon to return to a lower transmit power level to reduce power consumption. It may be that such an increase in transmit power level may be to a transmit power level above the maximum transmit power level which the radio beacon adopts in a default mode, e.g. when no user device is connected to it.

The user device may send signals to the radio beacon to change (e.g. reduce) its transmit power level directly. The user device may send signals to the radio beacon to change (e.g. reduce) its transmit power level indirectly, for example, through a network, such as a cellular communications network, the internet etc. This process may be controlled by a positioning controller with which the user device is in electronic communication. The positioning controller may generate the signals to radio beacons to change (e.g. reduce) their transmit power level. The positioning controller may, for example, be a remote service in electronic communication with the radio beacons. The positioning controller may be located proximate a plurality of radio beacons (for example, in the same room or in the same building) and in communication with the plurality of radio beacons by wired or wireless connections. The positioning controller may be distributed, for example, between radio beacons. The positioning controller may be integrated into a radio beacon which may in turn control one or more other radio beacons. The positioning controller may be a radio beacon controller. The positioning controller may comprise a Bluetooth interface for communicating directly with the radio beacons and/or the user device. More typically, the positioning controller may be in indirect electronic communication with the radio beacons and/or the user device. For example, the positioning controller may be in electronic communication with or be a functional module of a (typically remote) server which is in turn in electronic communication with the radio beacons and/or the user device. Said electronic communication may for example be over the internet and include wired/optical fibre/wireless connections or a mixture thereof. In an alternative example, the positioning controller may be in electronic communication with the radio beacons and/or the user device via a longer range (i.e. longer range than Bluetooth) peer to peer connection (e.g. over the Internet and/or a wireless connection such as Wi-Fi or Wi-Max).

An advantage of embodiments in which a positioning controller generates the signals to radio beacons to reduce their transmit power level is that, after a radio beacon has reduced its transmit power level it may no longer be detectable by a user device. If the positioning controller remains in electronic communication with the user device, then either the user device or positioning controller can determine that the user device cannot detect the radio beacon at its reduced transmit power level. It may be that the radio beacon transmits a signal representative of the transmit power level to which it is about to change before it changes. This is useful whether the radio beacon is increasing or decreasing its transmit power level, but can be especially useful when the radio beacon is about to reduce its transmit power level. It is especially useful in embodiments where the radio beacon transmits its power level and the user device uses the power level information transmitted by the radio beacon to determine the transmit power level of the radio beacon. In some embodiments it will be sufficient that the signal indicates simply that the transmit power level is about to decrease without it being essential to indicate the reduced transmit power level.

Thus, it may be that the radio beacon, in response to receipt of a said signal causing the radio beacon to change (typically reduce) its transmit power level, but before the radio beacon changes (typically reduces) its transmit power level, transmits a signal which is indicative that it is about to change its power level and/or indicative of the transmit power level to which it is about to change.

It can be advantageous that the said signal is transmitted responsive to receipt of a single to change transmit power level in that that provides a user device (or positioning controller where applicable) with a handshake confirming that the radio beacon is changing its power level responsive to the signal which was transmitted to the radio beacon and not for some other reason or due to potentially conflicting instructions from another user device.

The transmitted signal may be transmitted to the user device. The transmitted signal may be transmitted to the positioning controller, where present. In some embodiments, the positioning controller transmits a signal indicative that a radio beacon is about to change, is changing, or has just changed (e.g. reduced) its transmit power level and/or the power level to which the transmit power level of the radio beacon is about to change, is changing to, or has just changed.

The calculation of an estimate of the position of the user device may be made by the user device, or remotely from the user device, for example by a server in electronic communication with the user device (e.g. over a cellular communication network, over the internet etc.), or a said positioning controller.

The method may comprise receiving a measure of an environmental property which affects distance measurement with the radio (e.g. Bluetooth) signal received from the radio (e.g. Bluetooth) beacon, for example a measurement of ambient temperature or atmospheric property, or an identifier of a position calculation algorithm to use for position measurement (for example, an identifier of or a parameter for an environmental model to be used for position calculation). The measure of an environmental property may be measured by a sensor in the radio beacon. This received data can be used to improve measurements such as those based on received signal strength or time of flight measurements.

The invention also extends in a second aspect to a radio beacon (e.g. a Bluetooth beacon) operable to transmit data using radio (e.g. Bluetooth) signals at any of a plurality of discrete transmit power levels, wherein the radio beacon is programmed to change the transmit power level at which it transmits to facilitate estimation of the position of a user device.

By transmit power level we refer to a power level at which data can be transmitted, i.e. a non-zero power level at which the beacon can transmit data signals.

The radio beacon may be configured to automatically switch between at least some of the plurality of discrete transmit power levels (typically periodically), for example it may change between discrete transmit power levels in a cycle. The radio beacon may be operable to automatically switch between at least some of the plurality of discrete transmit power levels according to a program, for example to change periodically between discrete transmit power levels in a cycle. A cycle may be a cycle in which the transmit power level decreases monotonically from a highest level (which need not be the maximum transmit power level of which the respective radio beacon is capable) through at least one intermediate level to a lowest level before returning to the said highest level.

The radio beacon may be configured (e.g. programmed) to change the transmit power level at which it transmits responsive to a received signal (typically to facilitate estimation of the position of a device, typically but not necessarily the device which transmitted the received signal). The received signal may be a radio (e.g. Bluetooth) signal received from a user device which is receiving data from the radio beacon. The received signal may be received from a controller, such as a positioning controller, for example using a wired or wireless network. Typically, the radio beacon changes the transmit power level at which it transmits responsive to a received signal by reducing the transmit power level at which it transmits (where possible). Preferably, the radio beacon is configured (e.g. programmed) to reduce the transmit power level at which it transmits directly in response to a received signal. That is, the radio beacon is configured (e.g. programmed) to reduce the transmit power level at which it transmits in response to a received signal without cycling the transmit power level through any higher power levels before reducing the transmit power level. Preferably, the radio beacon is configured (e.g. programmed) to reduce the transmit power level at which it transmits responsive to a received signal within 1 second of receiving the received signal, more preferably within 0.5 seconds of receiving the received signal, and even more preferably within 0.25 seconds of receiving the received signal. In each case, the reduction from the first discrete transmit power level to a second discrete transmit power level typically takes place unless the first discrete transmit power level is the lowest discrete transmit power level of a plurality of discrete transmit power levels at which the radio beacon is operable. The radio beacon may then automatically increase the transmit power level again after a predetermined period of time.

It may be that the radio beacon is configured to transmit a signal indicative that it is about to change (e.g. reduce) transmit power level and/or representative of the transmit power level to which it is about to change, before it changes. It may be that the radio beacon in response to receipt of a said signal causing the radio beacon to change (typically reduce) its transmit power level, but before the radio beacon changes (typically reduces) its transmit power level, transmits a signal which is indicative that it is about to change its power level and/or indicative of the transmit power level to which it is about to change.

The radio beacon may be battery powered. The radio beacon typically transmits an identifier (e.g. MAC ID) of the radio beacon in its transmitted radio (e.g. Bluetooth) signal. The radio beacon may transmit its position in its transmitted radio signal. The radio beacon may transmit data concerning its current transmit power level in its transmitted radio signal.

The radio beacon may transmit data to facilitate accurate distance measurement, for example, a measure of a property of the environment adjacent the radio beacon, or an identifier or parameter of an algorithm for use in position determination (such as an environmental model). The radio beacon may comprise a sensor to measure a property of the environment around the radio beacon, for example air pressure or temperature, and may be configured to transmit a measurement of that property in its transmitted radio (e.g. Bluetooth) signal.

Typically the radio beacon is configured to transmit signals complying with a short range (i.e. typically a range of less than 500 m, more typically a range of less than 200 m, even more typically a range of less than 100 m) wireless connectivity standard, such as Wi-Fi or Bluetooth. In one embodiment, the radio beacon may be a connectable radio beacon, such as a Wi-Fi access point. More typically, the radio beacon is a Bluetooth beacon. That is, the radio beacon is typically configured to transmit signals complying with one of the Bluetooth short range wireless connectivity standards. The radio beacon may, for example, be compatible with the Bluetooth short range wireless connectivity standard core specification version 4.0 or later. The Bluetooth short range wireless connectivity standard core specification version 4.0 is advantageous at is allows transmission at any of a plurality of discrete transmit power levels. Bluetooth is a trade mark of the Bluetooth special interest group. The Bluetooth short range wireless connectivity standard core specification is published from time to time at the domain www.bluetooth.org.

The radio beacon may be operable to detect radio beacons (including radio beacons according to the invention and other radio beacons which are not according to the invention, for example, known wireless access points) and to transmit data concerning detected radio beacons to a data collection device, such as a server. The data which is transmitted typically comprises identifiers of the radio beacons detected by the radio beacon (e.g. MAC addresses). The data which is transmitted typically comprises signal strength data concerning the strength of signals received from detected radio beacons. The data may be sent through the internet or through a gateway device, for example a positioning controller which sends control signals to and receives data from the radio beacon, or a user device which is periodically deployed to retrieve the data from the radio beacons.

The invention also extends in a third aspect to a positioning controller comprising at least one radio transceiver, programmed to communicate with a user device and one or more radio beacons according to the second aspect of the invention, and to transmit control signals to one or more radio beacons to cause the radio beacons to change (typically reduce) their transmit power level to facilitate estimating the position of the user device.

The controller may be programmed to receive signals to change (typically reduce) the transmit power of one or more radio beacons from a user device and to send signals to change (typically reduce) the transmit power level of one or more radio beacons responsive thereto.

The controller may be programmed to determine when to issue signals to change (typically reduce) the transmit power level of one or more radio beacons and to issue said signals. The controller may be programmed to determine when to issue said signals to facilitate the estimation of the position of a plurality of user devices in communication with the positioning controller at once.

The controller may be programmed to transmit data concerning the radio beacons which it can detect to a data collection device, such as a server. The transmitted data may, for example, comprise the identifiers of one or more radio beacons which it can detect. The transmitted data may, for example, comprise the received signal strength of signals from one or more radio beacons which it can detect.

Optional features described in relation to the first, second or third aspect of the invention are optional feature of each of the first, second and third aspects of the invention.

The invention also extends to a computer program which, when executed by a processor, causes the processor to estimate the position of a user device by the method of the first aspect of the invention. The computer program may be adapted to be executed by the processor of a user device to estimate the position of the user device. The computer program may be adapted to be executed by the positioning controller. The invention also extends to a computer program which, when executed by a processor of a radio beacon, causes the radio beacon to function as a radio beacon according to the second aspect of the invention.

The said computer programs may be stored on a tangible computer readable medium, such as a memory (e.g. RAM, ROM, PROM, EPROM, EEPROM), or optical or magnetic disk.

DESCRIPTION OF THE DRAWINGS

An example embodiment of the present invention will now be illustrated with reference to the following Figures in which:

FIGS. 9A through 9D are a flow diagram describing a procedure for estimating position where the transmit power level of individual radio beacons can be changed.

DETAILED DESCRIPTION OF AN EXAMPLE EMBODIMENT

Figure 1:
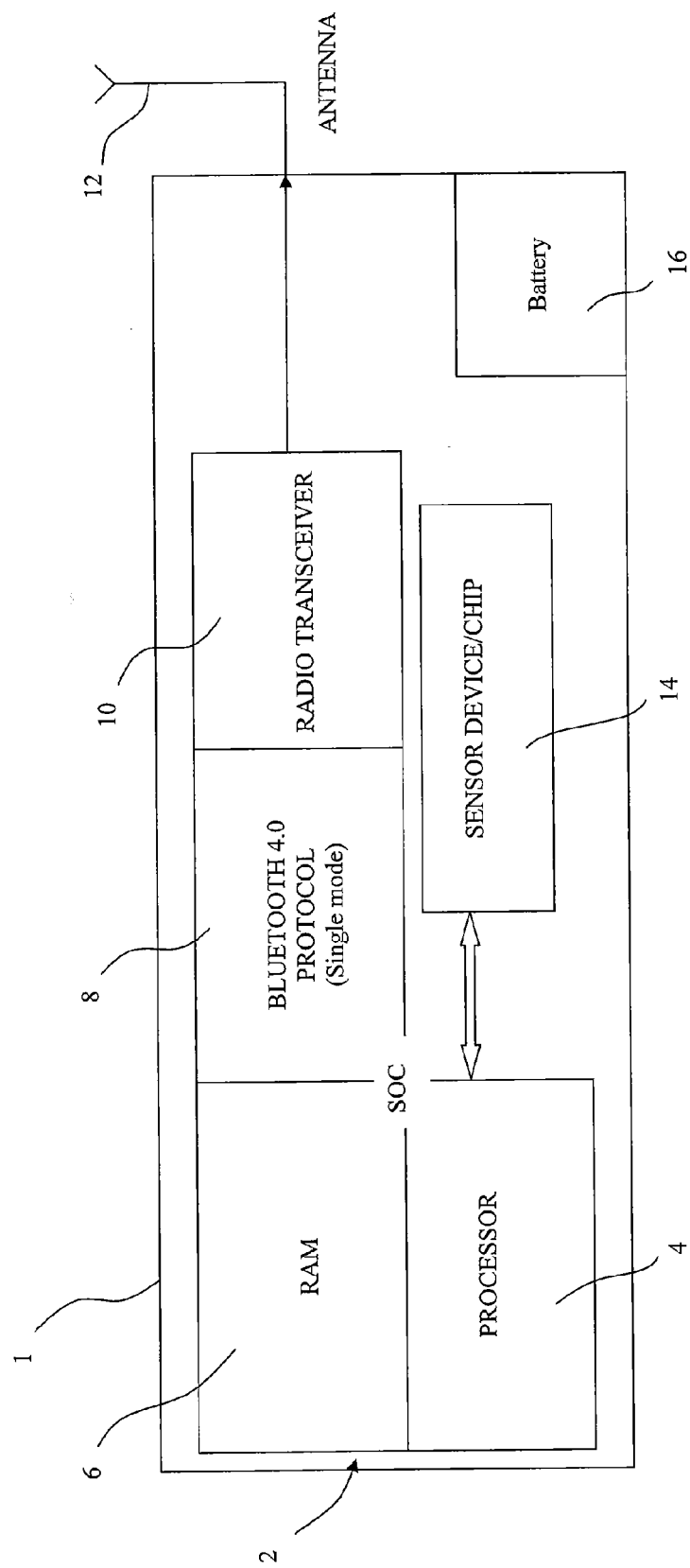
FIG. 1 is a schematic diagram of a beacon.

With reference to FIG. 1, a radio beacon 1 has a system on chip IC 2 (which may for example, be a CC2540 from Texas Instruments, CSR1000 or CSR 1001 from CSR, EM9301 from EM Microelectronics or nRF800 series from Nordic semiconductor which runs Bluetooth short range wireless connectivity standard version 4.0 protocol for a single mode device, including the Bluetooth 4.0 location and proximity profiles) including a processor 4, RAM memory 6, a Bluetooth short range wireless connectivity standard version 4.0 protocol communications module 8 and a radio frequency transceiver module 10. The memory stores program code executable by the processor in use and data, including an ID (e.g. MAC ID) of the radio beacon, and the position of the radio beacon (for example, as latitude, longitude and optionally altitude).

The radio frequency transceiver module 10 is in electrical communication with an antenna 12 and the processor is in electrical communication with a sensor chip 14, which may for example be a temperature or pressure sensor for measuring ambient temperature or pressure. The beacon also includes a battery 16 as power supply. The Bluetooth short range wireless connectivity standard version 4.0 is useful for the method of the present invention as it allows for the transmission of radio signals at any of a plurality of discrete transmit power levels. The transmit power level of the radio beacon, from amongst the plurality of discrete transmit power levels, at which the radio beacons transmits at any given time is selectable, e.g. by a processor. The available power levels will typically depend on the specification of the particular system on a chip. In an example embodiment, there are three power levels, −4 dBm, 0 dBm and 4 dBm. The processor can instruct the Bluetooth short range wireless connectivity standard version 4.0 protocol module to change the transmit power level to between the available transmit power levels under the control of a program stored in the memory.

The beacon may be a connectable beacon, to which other devices can connect, or a non-connectable beacon. Non-connectable beacons according to the invention change their transmit power level according to a program. Connectable beacons can change their transmit power level responsive to an instruction from a user device or positioning controller. They may also change their transmit power level according to a program. In some embodiments, the positioning controller may be provided as a cloud service, i.e. the positioning controller may comprise a functional module (e.g. executable program code stored on a tangible computer readable medium and executed on a microprocessor) of a server which communicates with the Bluetooth beacons over the internet.

Figure 2:
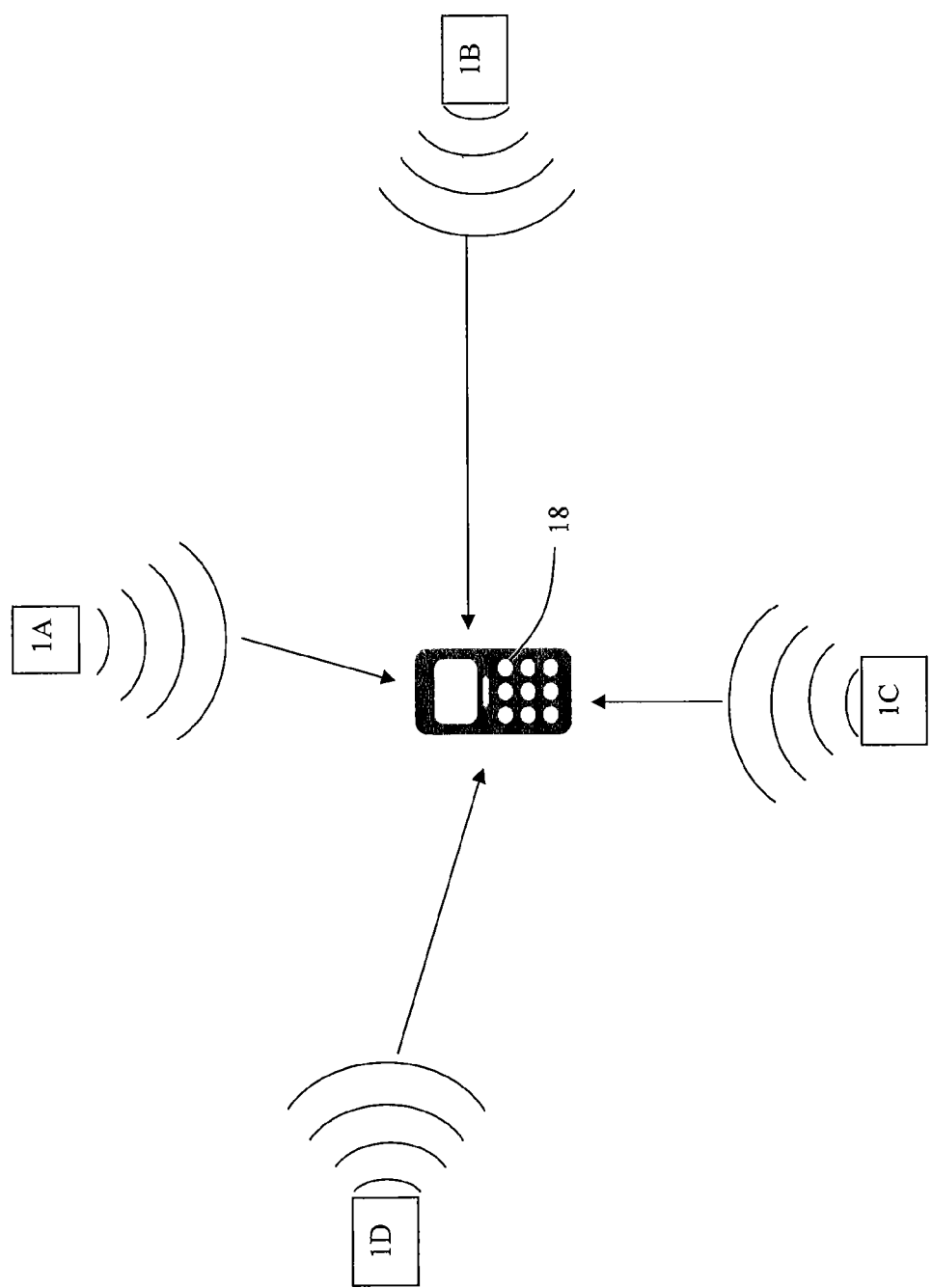
FIG. 2 is a schematic diagram of a system comprising a plurality of non-connectable beacons and a user device.
Figure 3:
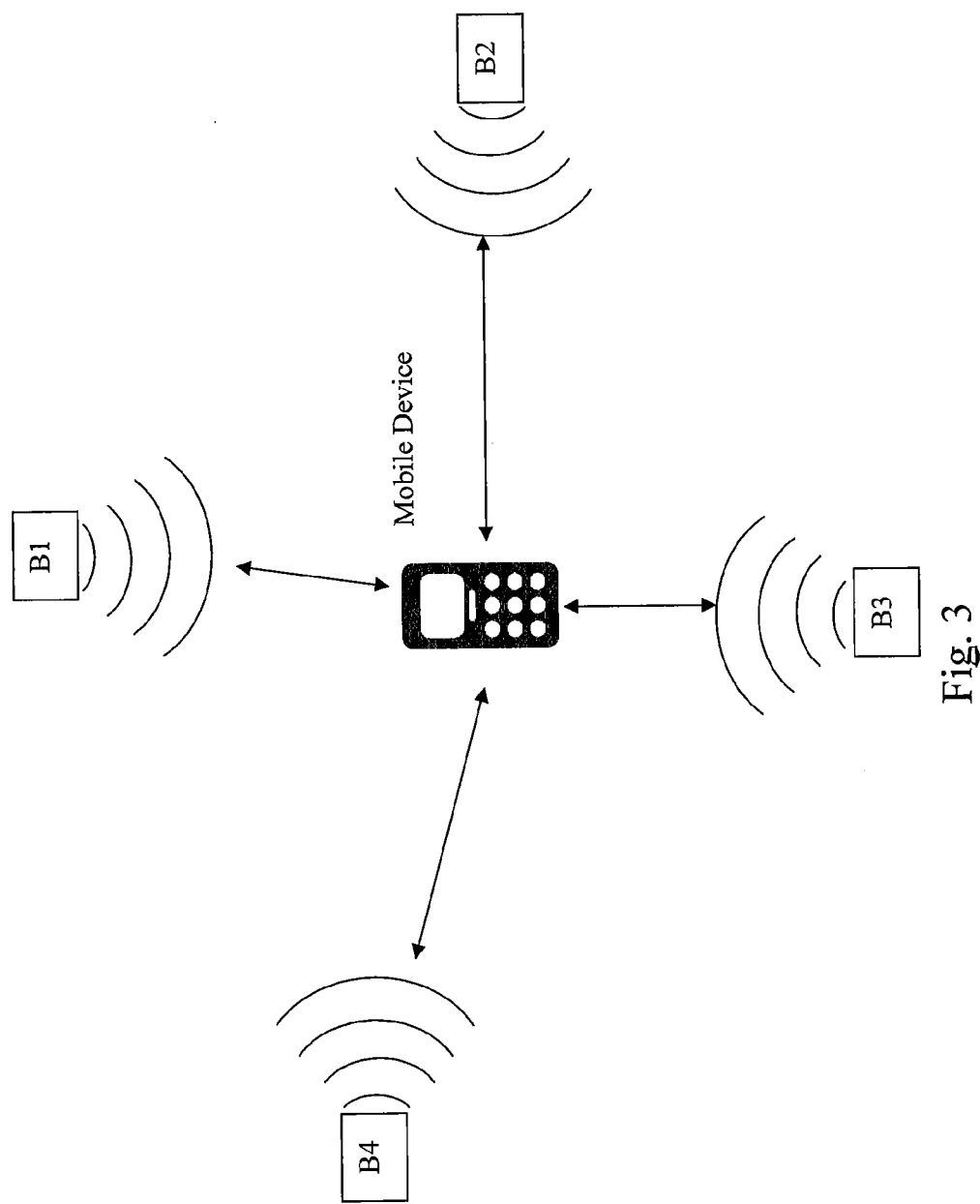
FIG. 3 is a schematic diagram of a system in which the radio beacons are connectable beacons.

FIG. 2 illustrates a system comprising a plurality of non-connectable beacons 1 and a user device in the form of a Bluetooth enabled cellular telephone 18. FIG. 3 illustrates a corresponding system in which the radio beacons 1 are connectable beacons, which operate independently.

Figure 4:
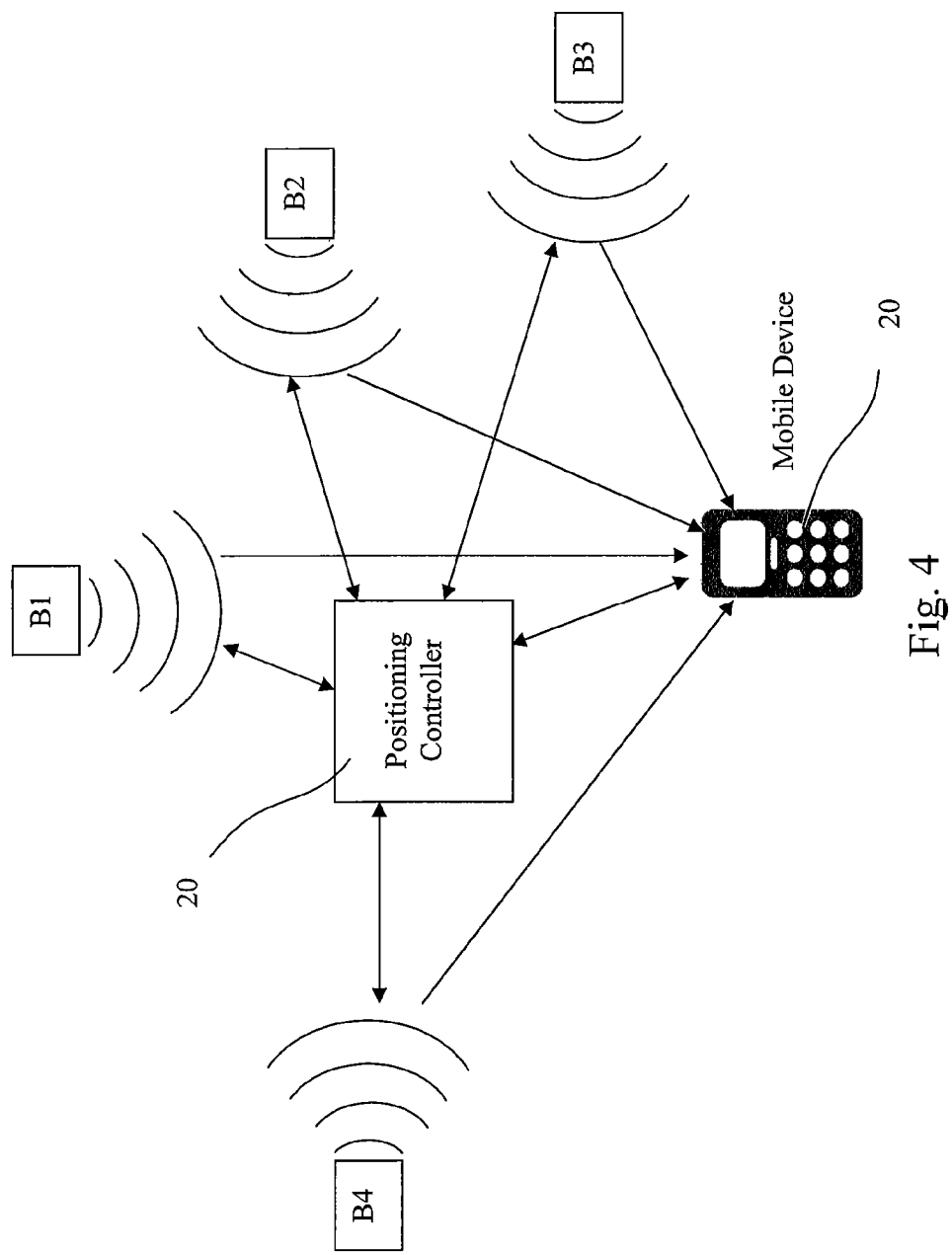
FIG. 4 is a schematic diagram of an alternative system including a controller.
Figure 5:
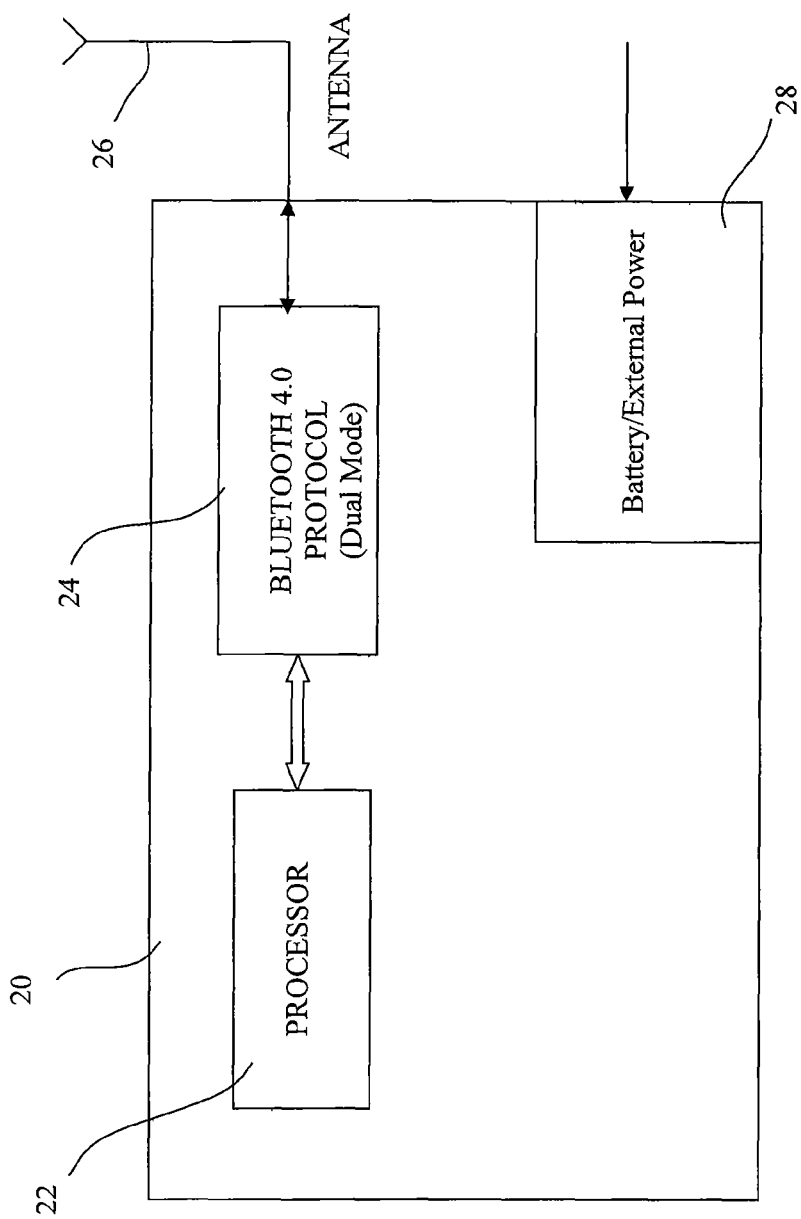
FIG. 5 is a schematic diagram of a controller for use in the embodiment of FIG. 4.

FIG. 4 illustrates an alternative embodiment in which a plurality of connectable radio beacons 1 are in bidirectional communication with a controller 20 coordinates and controls the radio beacons. In this embodiment, the user device is in bidirectional communication with the controller and receives signals from the radio beacons but need not transmit signals to them (although bidirectional communication between radio beacons and the user device in this configuration is not ruled out). FIG. 5 is a schematic diagram of a suitable controller having a processor 22 in communication with a dual mode Bluetooth short range wireless connectivity standard protocol version 4.0 controller 24 in turn in communication with an antenna 26. The controller has a power supply 28 which may be a battery power supply or a circuit for receiving an external power supply.

Figure 6:
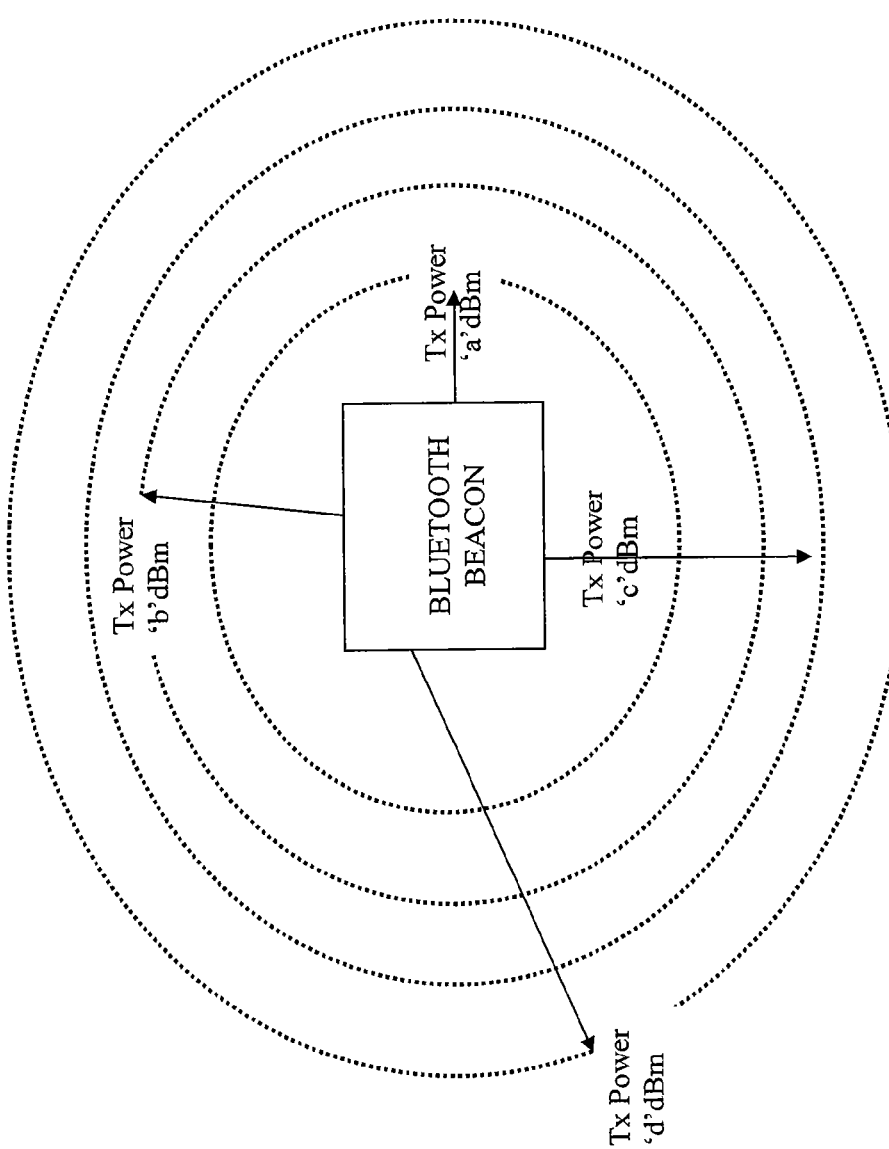
FIG. 6 illustrates the variation in the coverage of a beacon with transmit power level.

With reference to FIG. 6, the distance at which a radio beacon is detectable using a Bluetooth short range wireless connectivity standard version 4.0 compatible device varies with the transmit power level. If a radio beacon has four transmit power levels a dBmW, b dBmW, c dBmW and d dBmW where a<b<c<d then the distance from the radio beacon at which it could expect to be detected would be greatest for transmit power level d and successively less for transmit power levels c, b and a respectively.

During operation, the beacons broadcast their position and data identifying their output power level. Their position may be broadcast in the form of latitude, longitude and altitude information, such as would typically be used for a global satellite positioning service, or local coordinates (x, y and typically also z) defined for a particular installation. The power level may be broadcast as a numerical value indicative of transmit power level in suitable units, such as dBmW, or as a range at which the radio beacon would typically be detectable by a compatible device (e.g. a distance in meters or other units). If the user device has an atypically good or bad ability to detect and receive data from radio beacons it may take this into account in subsequent calculations of position.

Figure 7:
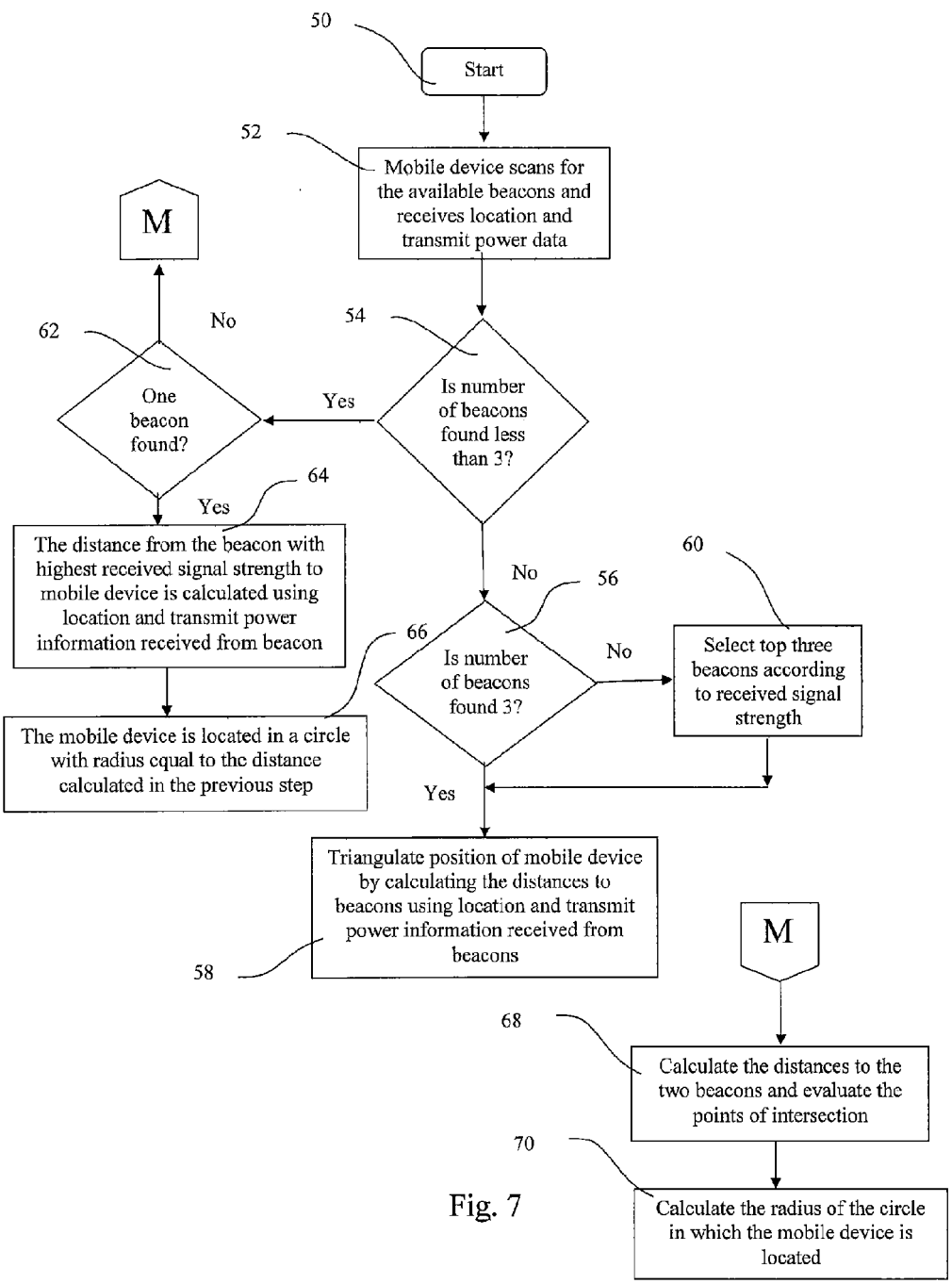
FIG. 7 is a flow diagram of a method of estimating the position of a user device by measuring distance to one or more radio beacons.

An example method of estimating the position of a user device is illustrated in FIG. 7. The procedure begins 50, whereupon the user device scans 52 for available beacons and retrieves data concerning the location and transmit power of those beacons, either from the beacons if they transmit that data, or from another source, for example by retrieving data from a database.

It is then determined 54 whether the user device has found fewer than three beacons. If at three or more radio beacons have been found it is determined 56 whether the number of beacons is exactly three, or greater than three. If three beacons are found, then the position of the user device can be determined 58 by trilateration.

As it receives data concerning the current output power level from each beacon, it can work out distance to each radio beacon despite the fact that the transmit power level of the radio beacon may be variable. The received signal strength is compared with the current output power level and the attenuation of the signal between the radio beacon and the receiver can be used to estimate the distance to the radio beacon using radio propagation models familiar to one skilled in the art. If more than three radio beacons can be detected then typically the three for which there is the greatest received signal strength will be selected 60 and used for trilateration. Nevertheless, other factors may be taken into account, such as estimates of the accuracy of the position of individual radio beacons. If more than three radio beacons can be detected then that provides additional information which can be used to improve the position estimate.

If however, fewer than three beacons were found, the following procedure depends whether only one beacon was detected 62. If only one beacons were detected, then the distance from that beacon is calculated 64 using the location and transmit power data, received from the beacon or a database. The position of the user device can then be estimated 66 as being in a circle with radius equal to that distance, centered around the known position of the beacon.

An estimate of distance from an individual beacon can be obtained using knowledge of the transmit power ($P_t$) of the beacon and the received signal strength in the form of received power ($P_r$), according to the following formula:

$$P_r = P_t G_t G_r (\lambda/4\pi d)^2$$

Where $G_t$ and $G_r$ are transmit antenna and receive antenna gains respectively, $\lambda$ is the wavelength of the relevant signal, and d is the distance between the transmitter and the receiver. The transmit antenna and receive antenna gains can be taken into account in calculations, approximated to 1, or $G_t$ could be included in the value of transmit power level transmitted by the beacon or stored in a database in relation to the beacon. Thus, the data concerning the transmit power level may comprise $P_t$, or $P_t G_t$, for example. For beacons according to the Bluetooth short range wireless connectivity standard version 4.0 specification which operate at 2.4 GHz, $\lambda$=0.125 m.

Where position is calculated with reference to a single beacon, the position of user device will be in the circle of distance calculated using the above formula, centered on the position of the beacon.

If, however two beacons have been found, then the distance to each of two beacons is calculated 68 and used to estimate the position of the user device. The position of the user device can be determined as either of the two intersects between circles having a radius equal to the measured distances from the two respective beacons, centered on the two respective beacons. In some implementations, in that case, the position of the user device is determined as being in a circle having a diameter equal to the distance between the two intersects, with a centre at the mid-point between the two intersects. In some circumstances, ambiguity as to on which side of the line directly connecting two beacons the user device is located might be resolved using, for example, previous measurements of the position of the user device.

However, the invention also extends to embodiments in which the beacons change their power level to facilitate positioning. As will be described, it is also possible to carry out measurements of position simply by determining whether or not individual radio beacons can be detected when they are transmitting at specific transmit power levels.

Figure 8:
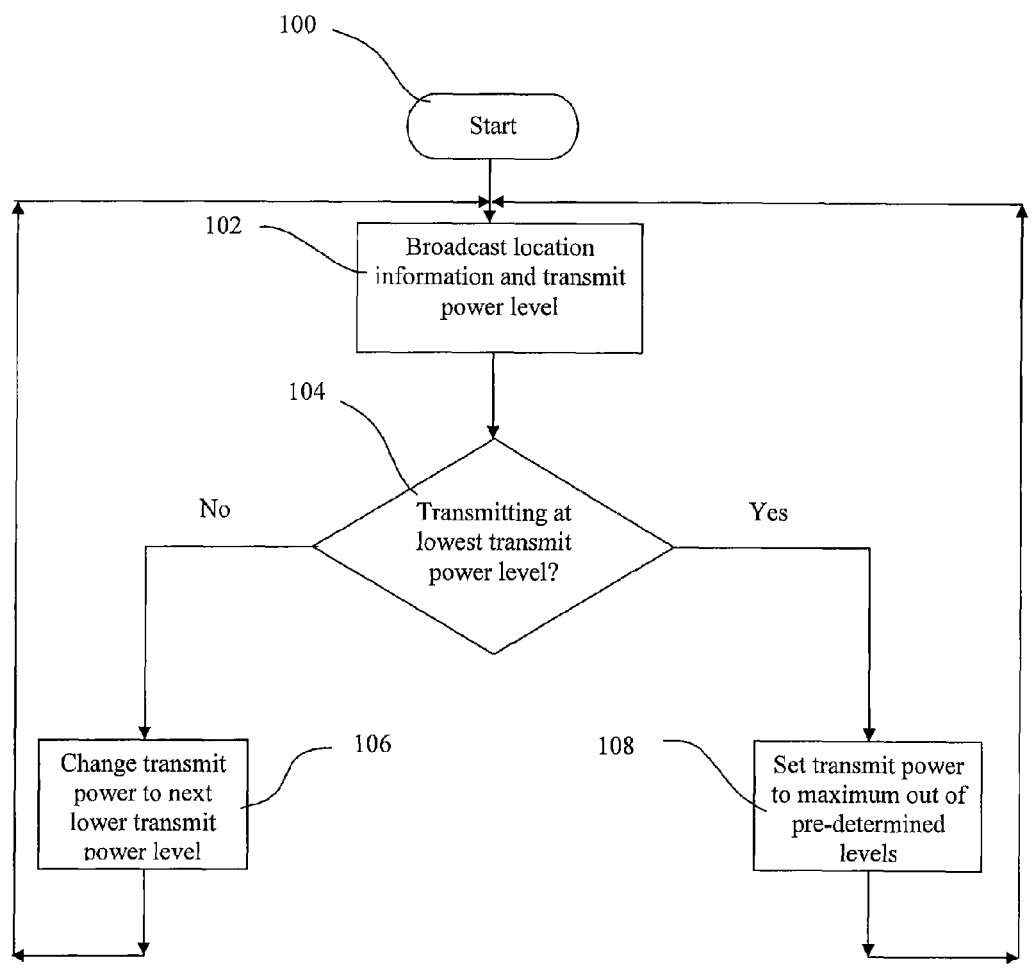
FIG. 8 is a flow diagram describing the default operation cycle of a beacon.
Figure 9A:
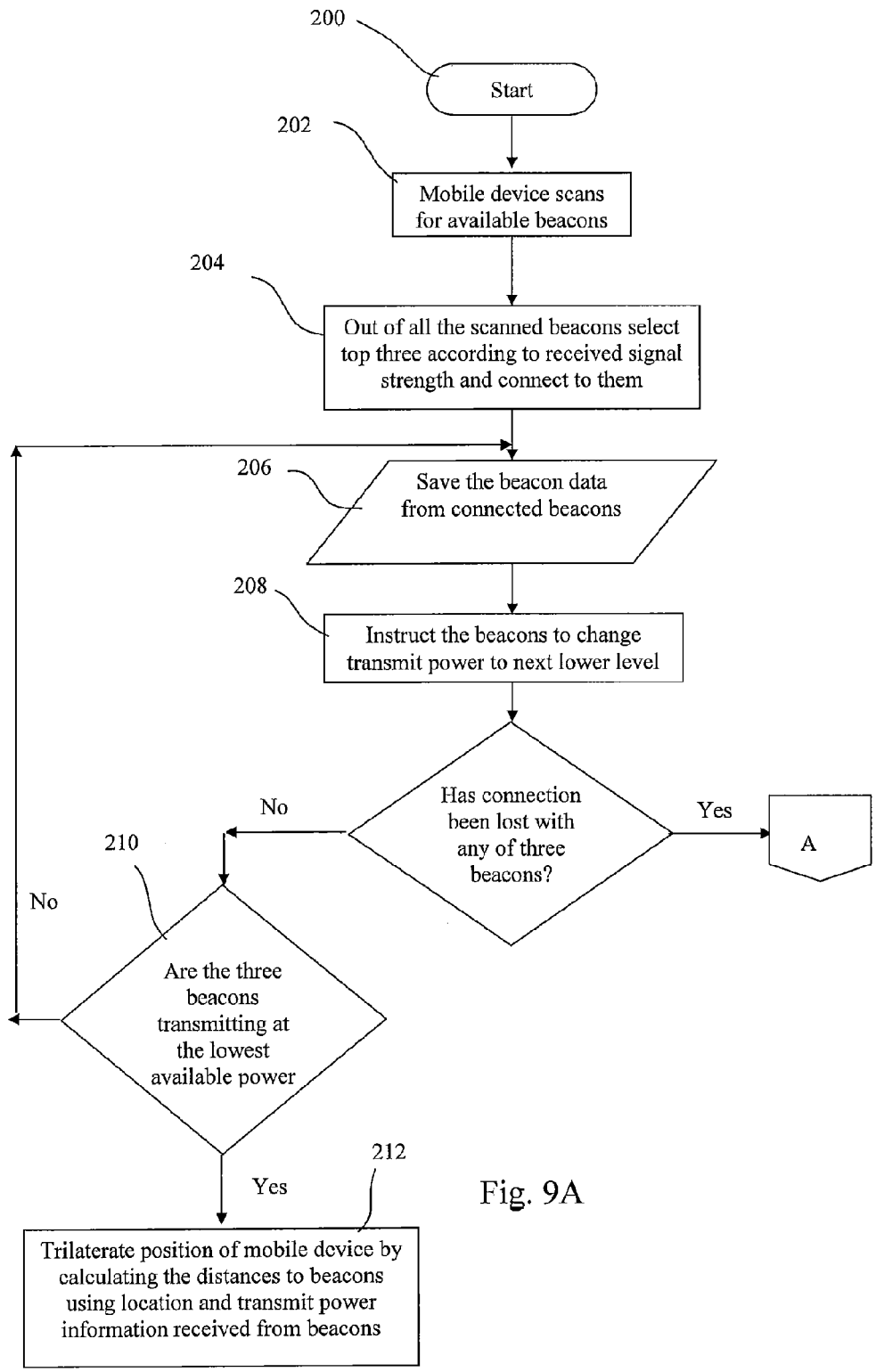
Figure 9B:
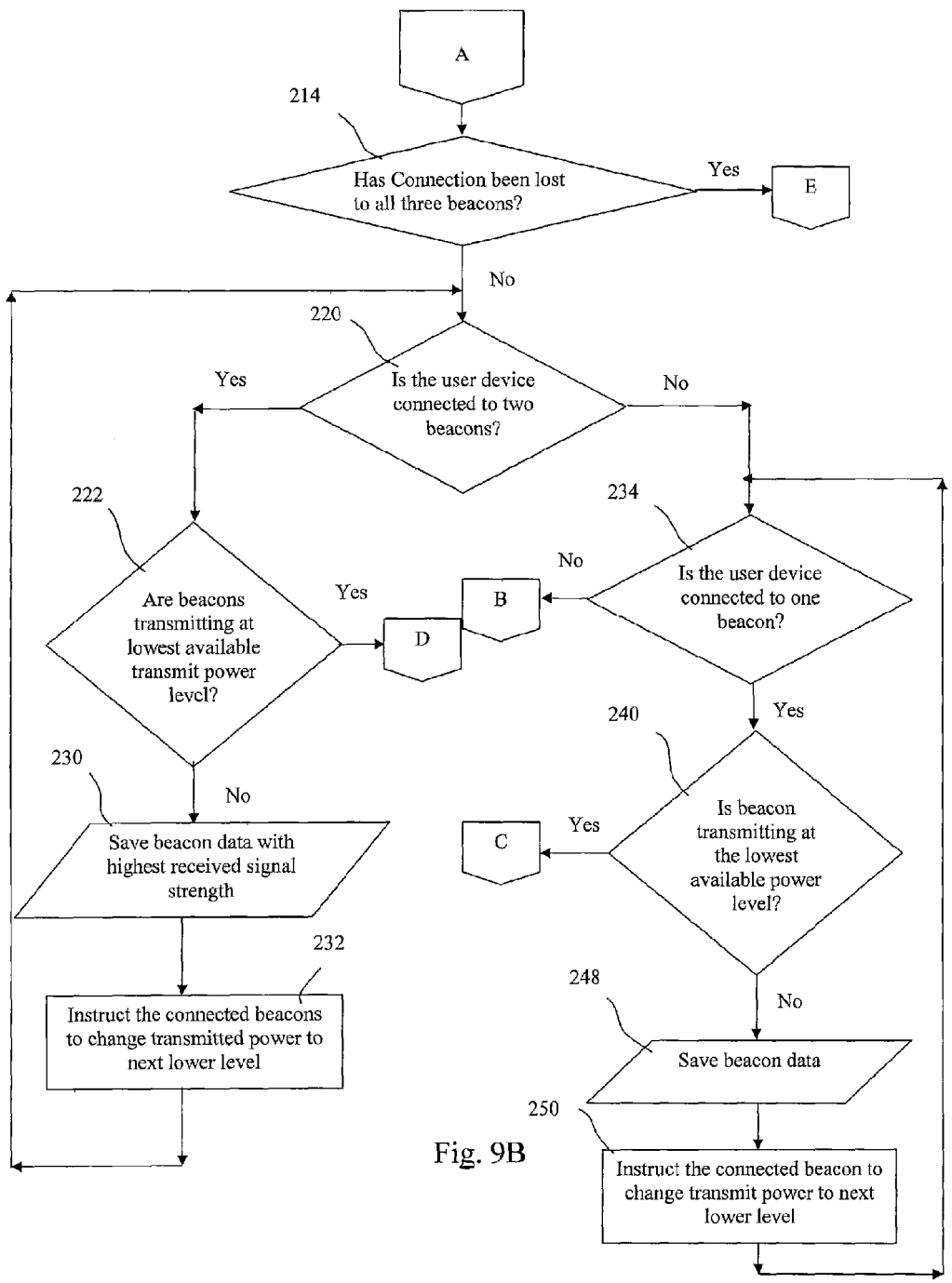
Figure 9C:
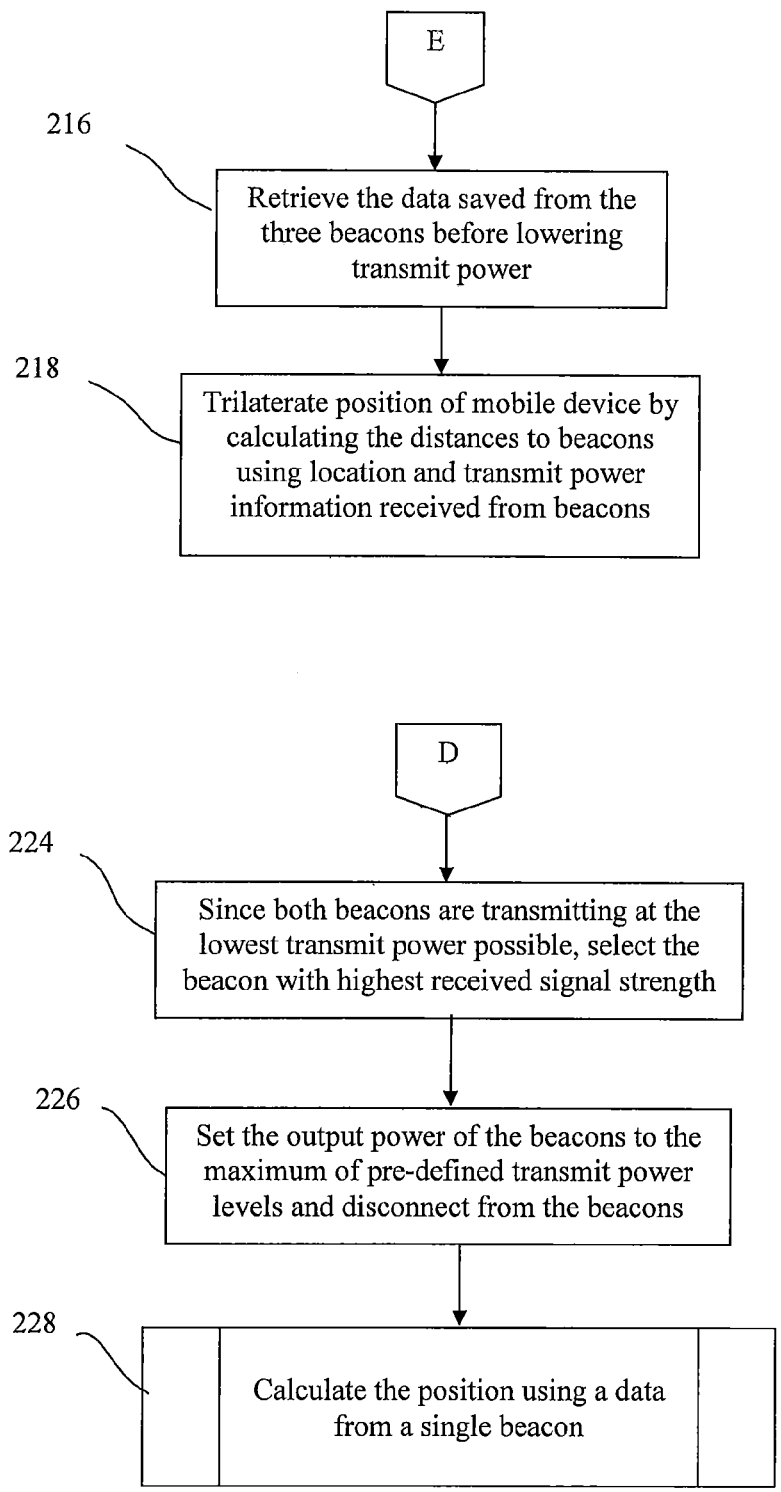

FIG. 8 is a flowchart of an operating procedure or a radio beacon which, in at least one operating mode, changes its power level periodically in a cycle. The process starts 100 when the beacon is switched on or instructed to enter the default operating mode. It adopts a first transmit power level and broadcasts 102 data concerning its position and transmit power level. After a period of time it determines whether it is broadcasting 104 at the lowest (non-zero) output power level which is available to it. If not, it reduces 106 its power to the next lower output power level which is available to it and continues broadcasting data concerning its position and transmit power level. If it is, then it increases 108 its power to the highest output power level in a cycle of a power levels. This need not be the highest transmit power level of which the radio beacon is capable, to avoid unnecessary energy consumption. The highest output power level in the cycle of power levels may be different for different radio beacons, for example, it may be selected depending on the density of other radio beacons suitable for use in positioning. In an example embodiment, the beacon starts broadcasting position and transmit power information at 4 dBmW, then it checks if it is transmitting at lowest transmit power (that is −4 dBm). As it is not transmitting at the lowest possible power, the next available lower transmit power (that is 0 dBm) is used to transmit the next broadcast of data. Once the data is broadcasted, it checks if the transmit power is lowest, as it is not the lowest the beacon sets it's transmit power to the next lower transmit power (that is −4 dBm) and broadcasts the data. Then the transmit power is checked again, as it is the lowest transmit power available, the beacon now sets it transmit power to the maximum transmit power available. Then the whole process is repeated over and over.

It is then possible to estimate the position of the user device taking into account whether or not individual radio beacons are detectable at particular transmit power levels. If a radio beacon can be detected at a transmit power level at which it would typically be detectable at a distance of x meters, it can be deduced that the user device is located within x meters of the position of the radio beacon. If a radio beacon cannot be detected at a transmit power level at which it would typically be detectable at a distance of y meters, it can be deduced that the user device is located at more than y meters from the position of the radio beacon. Thus, each detection of a radio beacon at a transmit power level or the failure to detect a radio beacon at a transmit power level provides information as to a locus within which the user device is located, or within which the user device is not located. Therefore, it is possible to obtain an estimate of the position of a user device without, for example, calculations of distance from a radio beacon using received signal strength. Thus, it is possible to consider simply whether radio beacons can and cannot be detected at particular output power levels, without using techniques such as analysis of the numerical value of received signal strength to estimate distance along a continuous scale. However, the method can be improved by adding analyses of a numeric value of received signal strength and estimating distance to individual radio beacons.

One skilled in the art will appreciate that there are always some inaccuracies due to slight errors in the known position of a radio beacon, measurement variations, effects due to environmental factors and so forth and so the resulting data may require processing, such as averaging, or probabilistic calculations if it is not fully consistent.

In a further example embodiment, the user device (or positioning controller) can transmit a signal to a radio beacon to reduce its output power level to facilitate positioning. This allows the same calculations to be made, but is quicker as there is no need to wait for the radio beacon to reduce its output power level according to its existing programming.

In a further embodiment, the possibility of the user device (or positioning controller) transmitting signals to radio beacons to reduce their output level to facilitate positioning is combined with estimates of distance from radio beacons of known position using techniques such as analysis of received signal strength. FIGS. 9A through 9D illustrate a procedure for estimating position using connectable radio beacons, which can receive instructions to reduce their output power level either directly from a user device, or from a controller. The procedure starts 200 whereupon the user device scans 202 for detectable radio beacons. Of the radio beacons which are detected, the three with the highest received signal strength are selected 204 and connected to. Data from those three radio beacons (including at least an identifier (e.g. MAC address), their current output power level and their position) is stored 206.

At least the three selected radio beacons are then instructed 208 to reduce their output power level to the next lower level. It is then determined whether the connection has been lost with any of the three beacons. If not, then it is determined 210 whether the three radio beacons are transmitting at the lowest available output power level. If not, then data from those three radio beacons is stored again and the procedure repeats. If they are transmitting at the lower available output power level, then the position of the user device is obtained by trilateration 212 using the positions of the three beacons (and the output power information received from the radio beacons if necessary). For example, if the output power information received from each of the three radio beacons is the same the centroid of the three beacons position may be used as an estimate of the position of the user device.

If on the other hand, the connection with any of the three beacons is lost when the power is reduced, it is determined 214 whether the connection has been lost with all three beacons. If so, then data previously saved concerning the position, received signal strength and transmit power level of the three beacons is retrieved 216 and the position of the user device is then estimated by trilateration 218 from the three beacons.

If, following the reduction of power, the user device is no longer connected to all three radio beacons, it is then determined 220 whether the user device remains connected to beacons. If it does, it is determined 222 whether the two beacons are transmitting at the lowest available power level. If so, then because both beacons are transmitting at the lowest possible transmit power level, the beacon with the highest received signal strength is selected 224. The output power of the beacons 2 to 8 is then set 226 to the maximum of the pre-defined transmit power levels. The user device is then disconnected from the beacons. The position is then calculated 228 using data from a single beacon.

If, on the other hand, it was found that the two beacons were not transmitting at the lowest available output power level, then position, transmit power level and received signal strength data is stored 230 for the radial beacon with the highest received signal strength. The two radio beacons to which the user device is connected are then instructed 232 to change their output power to the next lower level.

If at step 220, it was found that the user device is no longer connected to as many as two radio beacons, it is then determined 234 whether the user device is still connected to at least one beacon. If it is not, then the stored data concerning the beacon with the highest received signal strength when two radio beacons were connected is retrieved 236 and used to calculate 238 the position of the user device.

If the user device is connected to just one beacon, then it is determined 240 whether that radial beacon is transmitting at the lowest available transmit power level. If it is, then, since the beacon is transmitting at the lowest possible output power, then the available data (radio beacon position, radio beacon output power level and received signal strength) is used 242 to estimate the current position of the user device. The transmit power of that radio beacon is then set to the maximum of the pre-defined transmit power levels and the user device and disconnects 244 from the radio beacon. Position of the user device is then estimated 246 using data from that single radio beacon If, on the other hand, it was found that the single radial beacon was not transmitting at the lowest available transmit power level, then data concerning that radial beacon and the strength of the signal received from the radial beacon are saved 248, the radial beacon is instructed to change its transmit power level to the next lower level 250, and it is reassessed 234 whether the user device remains connected to a beacon.

The radio beacons typically transmit information about their position, and their current output power level, as well as an identifier, such as a MAC address. They may transmit additional information, for example a measurement of ambient temperature or pressure to facilitate positioning. Such measurements facilitate positioning as they can be fed into environmental models to enable more accurate calculations of distance from the attenuation of signals between a radio beacon and a receiver.

Separately, radio beacons may report data concerning the radio beacons which each can detect. For example, they may periodically transmit the MAC address and received signal strength of each radio beacon which they can detect to a remote server.

In embodiments in which a controller is present, although the user device receives the data from the beacons, instead of the user device requesting the beacons to change the transmit power, the user device may send this request to the controller and the controller passes on this request to beacons. Alternatively, the data measured by the user device are passed to the controller which itself decides to change the transmit power level of one or more beacons to facilitate determination of the position of the user device. The use of a controller which controls multiple radio beacons is helpful to efficiently organise determination of position in embodiments where there are multiple user devices in a limited volume, interacting with the same radio beacons. A controller may also collect data, for example, a controller may periodically transmit data comprising the MAC address and received signal strength of each beacon which it can detect to a server. It may alternatively or additional receive data from radio beacons comprising the MAC address and received signal strength of each radio beacon which that respective radio beacon can detect, and transmit that data to a server.

A controller is also useful in embodiments in which a radio beacon is instructed to reduce its transmit power level as, once the transmit power level has been reduced, a user device may no longer be able to detect the radio beacon. A controller might calculate the position of the user device taking into account that a user device can no longer detect a radio beacon, or transmit up to date information concerning the transmit power level of a radio beacon which has reduced its power level, to a user device. A user device may anyway be able to infer information concerning its position from determining that a radio beacon can no longer be detected, using knowledge of its current transmit power level e.g. because it is known to vary transmit power level according to a schedule (e.g. in a cycle) or from knowledge that it transmitted an instruction to the radio beacon to reduce its transmit power level. However, in some further embodiments, a radio beacon may transmit a signal indicative that it is about to change (e.g. reduce) its transmit power level and/or a signal indicative of the transmit power level to which it is about to change, before changing its transmit power level. This can provide additional confidence that the reason that the radio beacon can no longer be detected is due to the reduction in transmit power level and not for some other reason, e.g. it having been switched off, having failed or having changed to another mode.

The implementations described above typically use trilateration and nearest neighbour algorithms for positioning the user device. However, one skilled in the art will be aware of other algorithms such as the n-nearest neighbour algorithm, weighted nearest neighbour algorithm or probabilistic methods for tracking the user device.

Although in the embodiments described above, the position of the radio beacons is obtained from the signal transmitted by the radio beacons, the position of the radio beacons may be obtained by another known method, for example, from a database of radio beacons. This data may be downloaded from a remote server when required. Similarly, although in the embodiments described above, the instantaneous value of the output power level of the radio beacons is obtained from the signal transmitted by the radio beacons, in alternative embodiments, the schedule of output power level of radio beacons is predetermined and can be calculated or read from a database. This requires both the radio beacon and the processor which is calculating the position of the user device (whether that be the processor of the user device, or a remote processor) to have accurately synchronised clocks.

Although in the embodiments described above the radio beacons change their power level in a cycle and can also reduce their power level responsive to a signal to facilitate position determination, in some embodiments, the radio beacons do not require to change their power level in a cycle, simply to change their power level (typically reduce their power level) responsive to a signal, to thereby facilitate power determination.

Furthermore, although in the examples shown all of the radio beacons can change their transmit power level, positioning may also take into account measurements made following detection of other radio beacons which do not have the ability to change their transmit power level, for example estimates of position may take into account measurements made of the distance from a user to wireless access points which transmit at only a single transmit power level, using techniques known to the person skilled in the art.

Further variations and modifications may be made within the scope of the invention herein disclosed.

The invention claimed is:

1. A method of estimating the position of a user device comprising a Bluetooth receiver, the method comprising:
   the user device detecting one or more Bluetooth beacons configured to transmit signals at any of a plurality of discrete transmit power levels, and
   a computer processing system comprising a processor calculating an estimate of the position of the user device taking into account transmit power data concerning the transmit power level of the one or more said Bluetooth beacons at the time when the respective Bluetooth beacon is detected and beacon position data concerning the position of the one or more said Bluetooth beacons,
   wherein for some or all of the Bluetooth beacons, the respective Bluetooth beacon automatically switches between at least some of the plurality of discrete transmit power levels in a cycle in which the transmit power level decreases monotonically from a highest level through at least one intermediate level to a lowest level before returning to the said highest level.

2. A method according to claim 1, wherein the beacon position data is received from the Bluetooth beacons.

3. A method according to claim 1, wherein the transmit power data is received from the Bluetooth beacons.

4. A method according to claim 1, wherein, in at least some circumstances, the method does not take into account any measure of the strength of the signals received from the one or more Bluetooth beacons beyond whether or not the Bluetooth beacons can be detected.

5. A method according to claim 1, comprising taking into account that one or more Bluetooth beacons can not be detected at a given point in time.

6. A method according to claim 1, comprising taking into account that a Bluetooth beacon can be detected at a time when it is outputting signals at a first transmit power level and cannot be detected at a time when it is outputting signals at a second lower transmit power level.

7. A method according to claim 1, comprising receiving a measure of an environmental property which affects distance measurement with the radio signal received from the Bluetooth beacon.

8. A method according to claim 1, wherein at least some of the Bluetooth beacons are Bluetooth beacons compatible with the Bluetooth short range wireless connectivity standard core specification version 4.0 or later.

9. A non-transitory computer readable medium storing a computer program which, when executed by the processor, causes the processor to estimate the position of the user device by the method of claim 1.

10. A method of estimating the position of a user device comprising a Bluetooth receiver, the method comprising:
   the user device detecting one or more Bluetooth beacons configured to transmits signals at any of a plurality of discrete transmit power levels,
   a computer processing system, comprising a computer processor, calculating an estimate of the position of the user device taking into account transmit power data concerning the transmit power level of the one or more said Bluetooth beacons at the time when the respective Bluetooth beacon is detected and beacon position data concerning the position of the one or more said Bluetooth beacons, and
   causing a Bluetooth beacon to change its transmit power level to facilitate the estimation of the position of the user device,
   wherein the user device, or a positioning controller, is programmed to generate a signal to cause a Bluetooth beacon to reduce its transmit power from a first discrete transmit power level to a second lower discrete transmit power level and
   wherein in response to receipt of a said signal causing the Bluetooth beacon to reduce its transmit power level, but before the Bluetooth beacon reduces its transmit power level, the Bluetooth beacon transmits a signal which is indicative that it is about to change its power level and/or indicative of the transmit power level to which it is about to change.

11. A method according to claim 10, wherein the transmit power level of the Bluetooth beacon is increased to obtain a stronger signal.

12. A method according to claim 10, wherein the user device sends signals to the Bluetooth beacon to change its transmit power level directly or indirectly.

13. A Bluetooth beacon comprising:
   a transmitter configured to transmit data using radio signals at any of a plurality of discrete transmit power levels,
   a processing system including a computer processor, the processing system being programmed to change the transmit power level at which the transmitter transmits to facilitate estimation of the position of a user device, wherein the Bluetooth beacon is configured to automatically switch between at least some of the plurality of discrete transmit power levels, and
   wherein the Bluetooth beacon changes between discrete transmit power levels in a cycle, wherein the cycle is a cycle in which the transmit power level decreases monotonically from a highest level through at least one intermediate level to a lowest level before returning to the said highest level.

14. A non-transitory computer readable medium storing a computer program according to claim to perform the method of claim 10.

15. A non-transitory computer readable medium storing a computer program which, when executed by the processor of the Bluetooth beacon, causes the Bluetooth beacon to function as a Bluetooth beacon according to claim 13.

16. A Bluetooth beacon according to claim 13, wherein the Bluetooth beacon transmits its position in its transmitted radio signal.

17. A Bluetooth beacon according to claim 13, wherein the Bluetooth beacon transmits data concerning its current transmit power level in its transmitted radio signal.

18. A Bluetooth beacon according to claim 13, wherein the Bluetooth beacon transmits data to facilitate accurate distance measurement.

19. A Bluetooth beacon according to claim 18, wherein the Bluetooth beacon comprises a sensor to measure a property of the environment around the Bluetooth beacon and is configured to transmit a measurement of that property in its transmitted radio signal.

20. A Bluetooth beacon according to claim 13, wherein the Bluetooth beacon is compatible with the Bluetooth short range wireless connectivity standard core specification version 4.0 or later.

21. A Bluetooth beacon according to claim 13, wherein the Bluetooth beacon is configured to detect Bluetooth beacons and to transmit data concerning detected Bluetooth beacons to a data collection device.

22. A positioning controller comprising at least one Bluetooth transceiver, programmed to communicate with a user device and one or more Bluetooth beacons configured to transmit data using radio signals at any of a plurality of discrete transmit power levels, wherein the Bluetooth beacon is programmed to change the transmit power level at which it transmits to facilitate estimation of the position of a user device, and to transmit control signals to one or more Bluetooth beacons to cause the Bluetooth beacons to change their transmit power level to facilitate estimating the position of the user device.

23. A positioning controller according to claim 22, wherein the controller is programmed to receive signals to change the transmit power of one or more Bluetooth beacons from a user device and to send signals to change the transmit power level of one or more Bluetooth beacons responsive thereto.

24. A positioning controller according to claim 22, wherein the controller is programmed to determine when to issue signals to change the transmit power level of one or more Bluetooth beacons and to issue said signals.

25. A positioning controller according to claim 22, wherein the controller is programmed to transmit data concerning the Bluetooth beacons which it can detect to a data collection device.

26. A non-transitory computer readable medium storing a computer program which, when executed by a processor of a computing device having at least one Bluetooth transceiver, causes the computing device to function as a positioning controller according to claim 22.

27. A Bluetooth beacon comprising:
a transmitter configured to transmit data using radio signals at any of a plurality of discrete transmit power levels, and
a processing system including a computer processor, the processing system being programmed to change the transmit power level at which the transmitter transmits to facilitate estimation of the position of a user device,
wherein the Bluetooth beacon is configured to change the transmit power level at which the transmitter transmits responsive to a received signal from a user device which is receiving data from the Bluetooth beacon or a positioning controller,
wherein the Bluetooth beacon changes the transmit power level at which the transmitter transmits responsive to a received signal by reducing the transmit power level at which the transmitter transmits from a first discrete transmit power level to a second lower discrete transmit power level, and
wherein the Bluetooth beacon is configured in response to receipt of said signal causing the Bluetooth beacon to reduce its transmit power level, but before the Bluetooth beacon reduces its transmit power level, to transmit a signal which is indicative that it is about to change its power level and/or indicative of the transmit power level to which it is about to change.

* * * * *